United States Patent [19]
Itoh

[11] Patent Number: 4,799,237
[45] Date of Patent: Jan. 17, 1989

[54] CHANNEL-SYSTEM EXCHANGE SYSTEM FOR DIGITAL DATA RADIO-COMMUNICATION SYSTEM

[75] Inventor: Hideaki Itoh, Chofu, Japan

[73] Assignee: Fujitsu Limited, Kawasaki, Japan

[21] Appl. No.: 98,239

[22] Filed: Sep. 18, 1987

[30] Foreign Application Priority Data

Sep. 20, 1986 [JP] Japan .................. 61-220902

[51] Int. Cl.⁴ .................. H04K 1/00; H04L 1/02
[52] U.S. Cl. .................. 375/38; 340/825.01; 371/8; 375/40
[58] Field of Search .................. 375/38, 40, 100; 340/825.01, 825.03; 370/16; 371/8; 455/8

[56] References Cited

U.S. PATENT DOCUMENTS

| | | | |
|---|---|---|---|
| 4,234,956 | 11/1980 | Adderley et al. | 375/38 |
| 4,477,895 | 10/1984 | Casper et al. | 375/40 |
| 4,686,675 | 8/1987 | Morimoto et al. | 340/825.01 |

Primary Examiner—Robert L. Griffin
Assistant Examiner—Marianne Huseman
Attorney, Agent, or Firm—Staas & Halsey

[57] ABSTRACT

A channel-system exchange system for exchanging a channel-system between a main radio-communication channel system and a standby radio-communication channel system without loss of any data and with a high speed, regardless of a phase difference and/or pattern mismatch, on data in the two channel systems.

12 Claims, 11 Drawing Sheets

Fig. 2a    RM-DAT    0  1  2  3 | 4  5    (tsw)

Fig. 2b    RS-DAT          0  1  2 | 3  4  5

Fig. 4a                    Fig. 4b

| | MODE 1 | MODE 2 |
|---|---|---|
| MAIN | CH1 = 0 2 4 | CH1 = 1 3 5 |
|  | CH2 = 1 3 5 | CH2 = 0 2 4 |
| STANDBY | CH1 = 0 2 4 | CH1 = 0 2 4 |
|  | CH2 = 1 3 5 | CH2 = 1 3 5 |

Fig.6a D-SW
Fig.6b R-SW
Fig.6c MISMTCH
Fig.6d STANDBY COUNT (32)
Fig.6e STANDBY EXCHANGE (31)
Fig.6f MAIN COUNT (22)
Fig.6g MAIN EXCHANGE (21)

CHANNEL-SYSTEM EXCHANGE SYSTEM FOR DIGITAL DATA RADIO-COMMUNICATION SYSTEM

BACKGROUND OF THE INVENTION

1. Field of the Invention

The present invention relates to a communication system. More particularly, it relates to a channel-system exchange system for a digital data radio-communication system including at least one main radio-communication channel system and a standby radio-communication channel system, in which the exchange system is provided at a reception side of the main radio-communication channel system and exchanges the main radio communication channel system for the standby radio-communication channel system and vice versa.

2. Description of the Related Art

In a digital data radio-communication system, a channel exchange system is provided at the reception side of each main radio-communication channel system. The channel exchange system exchanges a channel from its main radio-communication channel system to a standby radio-communication channel system when any device in the main radio-communication channel system fails. The channel exchange system also exchanges a channel from the standby radio-communication channel system to the main radio-communication channel system when the failed device is restored. The channel exchange system also exchanges a line when receiving data errors due to fading are increased and restores the exchanged channel when the errors are reduced. Due to the provision of the channel exchange system, the reliability of the digital data radio-communication system is improved.

In order to avoid loss of data during the channel exchange, a high-speed semiconductor switch has been employed in the channel exchange system. The high-speed semiconductor switch may substantially realize the high speed channel exchange without data loss during the exchange so far as the exchange of talk data or the like, because a one or two bit data loss does not substantially affect the quality of such data. However, the high speed channel exchange of the prior art, even with a high-speed switch, cannot avoid the loss of at least one bit of data due to the phase difference between the data received in the main radio-communication channel system and in the standby radio-communication channel system and/or pattern mismatch of serial data to parallel data conversions at a transmission side in the main and standby radio-communication channel systems. This lost data will be described in more detail with reference to specific examples. When data to be communicated is of the digital type used for a computer system or the like, i.e., each bit having an important value and being unable to be lost, loss of even one bit must be prevented. Accordingly, prior art digital data radio-communication systems having such high speed exchange means cannot be applied to such digital data communication systems with high reliability and high quality.

SUMMARY OF THE INVENTION

An object of the present invention is to provide a channel exchange system for a digital data radio-communication which exchanges a channel between a main radio-communication channel system and a standby radio-communication system without loss of any bit of data and with high speed.

According to the present invention, there is provided a channel-system exchange system for a digital radio-communication system including at least one main radio-communication channel system and a standby radio-communication channel system, the channel-system exchange system being provided at a reception side of each main radio-communication channel system having a serial-to-parallel data converter (S/PC) converting serial data to be transmitted to a first plurality of channel data on the basis of a modulation method at a transmission side, and the standby radio-communication channel system having another S/PC having the same construction as the S/PC and converting the serial data to a second plurality of channel data on the basis of the modulation method at the transmission side.

The channel-system exchange system in each main radio-communication channel system includes a first exchange unit for exchanging a channel or channels of the first channel data received at the reception side of the main radio-communication channel system, a second exchange unit for exchanging a channel or channels of the second channel data received at the reception side of the standby radio-communication channel system, and a switching control unit, operatively connected to the first and second exchange units, for receiving first data exchanged at the first exchange unit and second data exchanged at the second exchange unit, and for switching and outputting either the first data or the second data on the basis of a channel-system exchange mode. The switching control unit detects a phase match between the first data and the second data, shifts either the first or second data defined by the channel-system exchange mode until predetermined bit of data are shifted when the phase match is not obtained, and activates either the first or second exchange unit determined by the channel-system exchange mode when the predetermined bit data shift is terminated. The activated exchange unit delays at least one channel data therein defined by a first relationship based upon the modulation method by one bit and exchanges the channel data on the basis of a second relationship defined by the modulation method. The switching control unit repeats the phase match detection for the channel exchanged data and switches either the received data on the basis of the channel-system exchange mode when the phase match is obtained.

The channel-system exchange system may further include a switching judgment unit, operatively connected to the switching control unit, for receiving the first channel data and the second channel data, for judging conditions of the main and standby radio-communication channel systems on the basis of the received channel data, and for outputting a signal indicating the channel-system exchange mode determined by the conditions to the switching control unit.

BRIEF DESCRIPTION OF THE DRAWINGS

Other objects and features of the present invention will be described below in detail with reference to the accompanying drawings, in which:

FIGS. 2a and 2b are graphs representing a phase difference between a main radio-communication channel data and a standby radio-communication channel data in FIG. 1;

FIGS. 4a and 4b are graphs representing a pattern match and a pattern mismatch of parallel converted data at the S/PC shown in FIG. 3;

DESCRIPTION OF THE PREFERRED EMBODIMENTS

Figure 1:
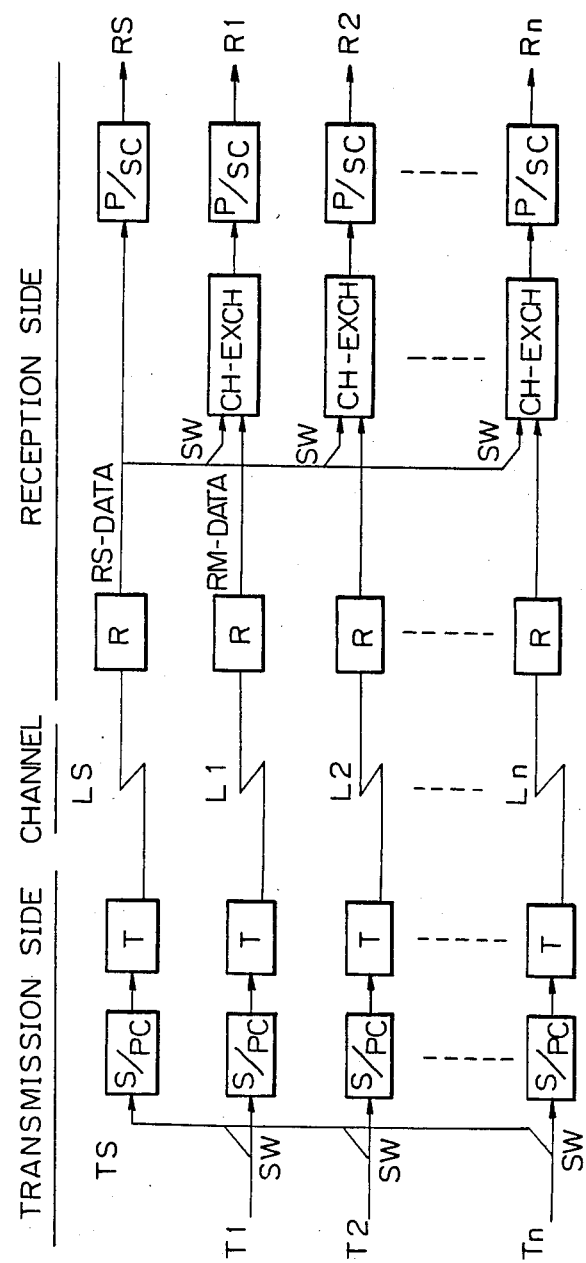
FIG. 1 is a block diagram of a digital data radio-communication system in which a channel system exchange system of the present invention is applied.

FIG. 1 is a block diagram of a digital data radio-communication system of the present invention. The digital data radio-communication system includes a plurality of main radio-communication channel systems and a standby radio-communication system. Each main radio-communication channel system includes a switching circuit SW, a serial data to parallel data converter S/PC, and a transmitter T at a transmission side, a channel, i.e. a data propagation path between the transmission side and a reception side, and a receiver R, a switching circuit SW, a channel-system exchange system CH-EXCH, and a parallel data to serial data converter P/SC at the reception side. The standby radio-communication channel system includes an S/PC and a transmitter T at the transmission side, a standby channel LS, and a receiver R and a P/SC at the reception side.

In a normal operation, each main radio-communication channel system, for example, a first main radio-communication channel system, at the transmission side, receives a serial digital transmission data T1, converts the received serial digital transmission data through the switching circuit SW to parallel data at the S/PC, and transmits the parallel-converted data to the reception side through the channel L1. At the reception side, the first main radio-communication channel system receives the transmitted data at the receiver R and supplies the same to the P/SC through the switching circuit SW and the channel-system exchange system CH-EXCH. The P/SC converts the received parallel data to a serial reception data R1.

In the normal operation state, the switching circuit on the transmission side is energized to supply the transmission data T1 to the S/PC. Also, the switching circuit SW on the reception side is energized to supply the data received at the receiver R to the channel exchange system CH-EXCH. The channel-system exchange system CH-EXCH supervises the quality of the received data. If the quality becomes low, the channel-system exchange system CH-EXCH activates a control circuit at the reception side (not shown) and also activates a control circuit at the transmission side (not shown) through a channel (not shown). At the transmission side, the control circuit deenergizes the switching circuit SW to supply the transmission data T1 to the S/PC in the standby radio-communication channel system. Simultaneously, at the reception side, the control circuit energizes the switching circuit SW in the first main radio-communication channel system to supply the data received at the receiver R in the standby radio-communication channel system to the P/SC in the first main radio-communication system through the channel-system exchange system CH-EXCH. As a result, if any device in the main radio-communication channel system fails or the channel is subjected to fading, the data communication may be continued. When the device is restored or the fading eliminated, the data communication of the main radio-communication channel system is restored from the standby radio-communication channel system by energizing (the switching circuits SW at the transmission side and by deenergizing the switching circuit SW the reception side.

The switching circuits SW at the transmission side include high speed semiconductor switches each consisting of, for example, gate circuits or switching transistors. Similarly, the switching circuits SW at the reception side include high-speed semiconductor switches. Accordingly, high speed channel data change at the transmission side and the reception side can be achieved.

However, a simple channel data change is insufficient in digital data exchange, especially the exchange of data used for computer systems or the like, due to lost data. Loss of data may arise due to a phase difference and/or pattern mismatch.

The above phase difference is caused by a propagation characteristic difference between the channel LS of the standby radio-communication channel system and the channel, for example, L1 of the main radio-communication channel system. More specifically, if the same transmission data is transmitted from the transmitters T in the main radio-communication channel system and the standby radio-communication channel system, data RM-DAT, shown in FIG. 2a, received at the receiver R in the main radio-communication channel system may differ from data RS-DAT, shown in FIG. 2b, received at the receiver R in the standby radio-communication channel system, due to the propagation time difference between the channel L1 and the channel LS. The data difference, i.e., the phase difference, may be one or more bits of data. At a time $t_{SW}$ shown in FIGS. 2a and 2b, a channel change is carried out, then a discontinuity of data train results.

Figure 3:
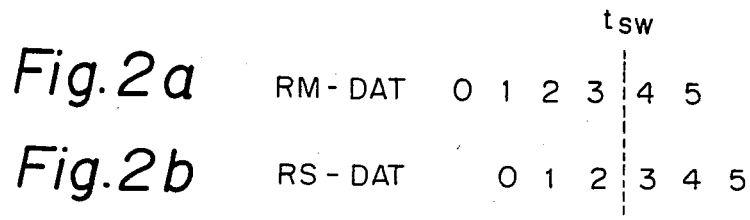
FIG. 3 is a block diagram of a serial data to parallel data converter (S/PC) for four phase-shift-keying modulation (PSK), shown in FIG. 1.

The pattern mismatch is caused by the timing difference between the S/PCs in the main radio-communication channel system and the standby radio-communication channel system, as shown in FIGS. 3 to 4b. FIG. 3 shows a block diagram of the S/PC converting an original transmission signal S-ORG of 32 MHz to two-channel data each of 16 MHz. FIG. 4a shows ideal parallel channel data MAIN and STANDBY converted from a same serial transmission data at the S/PCs in the main and standby radio-communication channel systems. However, the parallel-converted data MAIN may be shifted by a change of the conversion time, as shown at the top of FIG. 4b. At this time, if the parallel-converted data STANDBY, as shown at the bottom of FIG. 4b, is obtained, or vice versa, and the channel change is made, pattern mismatch at the reception side cannot be avoided.

When such a phase difference and/or pattern mismatch happens, a circuit connected to the P/SC of the main radio-communication channel system may become confused with the discontinuity of the data train or the discrepancy of the received data, stop the data reception, and thereafter restart the data reception after the complete change of the channel. This substantially means a system down state.

Preferred embodiments of the present invention will now be described.

Figure 5:
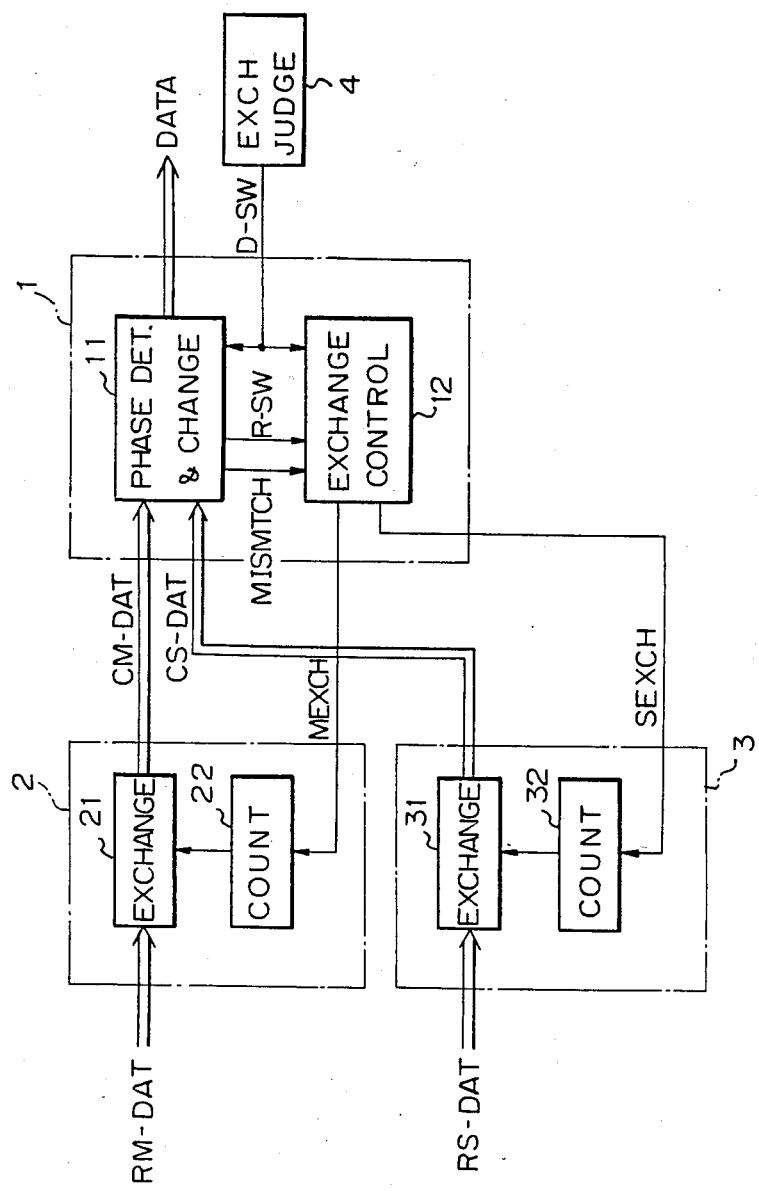
FIG. 5 is a block diagram of a channel-system exchange system of the present invention shown in FIG. 1.

FIG. 5 is a block diagram of the channel-system exchange system CH-EXCH in FIG. 1. The channel-system exchange system includes a switching control unit 1 comprising a phase detection and change circuit 11 and an exchange control circuit 12, a main exchange unit 2 comprising a main exchange circuit 21 and a main counting circuit 22, a standby exchange unit 3 comprising of a standby exchange circuit 31 and a standby counting circuit 32, and a switching judgment unit 4.

The phase detection and change circuit 11 receives main channel-exchange data CM-DAT from the main exchange circuit 21 and standby channel-exchange data CS-DAT from the standby exchange circuit 31, detects phase differences between the channel-exchange data CM-DAT and CS-DAT, and outputs a phase-mismatch signal MISMTCH to the exchange control circuit 12 when phase differences are detected. Upon receipt of the phase-mismatch signal MISMTCH, the exchange control circuit 12 outputs exchange command MEXCH or SEXCH to the main or standby exchange unit 2 or 3.

The main exchange unit 2 and the standby exchange unit 3 have substantially the same circuit construction. The main exchange unit 2 exchanges main reception data RM-DAT from the receiver R in response to the main exchange command MEXCH. The standby exchange unit 3 also exchanges standby reception data RS-DAT from the receiver R in response to the standby exchange command SEXCH. In other words, the main exchange unit 2 exchanges the channels CH1 and CH2 as shown in FIGS. 4a and 4b so as to adjust data-branch patterns by a modulation method and outputs channel-exchanged data CM-DAT. The standby exchange unit 3 functions similarly to the main exchange unit 2.

Referring to FIGS. 6a to 6g, the operation of the channel-system exchange system CH-EXCH shown in FIG. 5 will be more specifically described, with reference to the digital data radio-communication system shown in FIG. 1.

When many data errors appear in the first main radio-communication channel system, the switching judgment unit 4 decides whether to switch the radio-communication system from the main radio-communication channel system to the standby radio-communication channel system. The switching judgment unit 4 outputs a switching demand signal D-SW to the phase detection and change circuit 11 and the exchange control circuit 12 (FIG. 6a), so that, by the exchange control circuit 12, the switching circuit SW at the transmission side is energized to apply the transmission data T1 to the standby radio-communication channel system. The switching circuit SW at the reception side is also energized to apply the reception data RS-DATA of the standby radio-communication channel system to the standby exchange circuit 31 in the channel exchange system CH-EXCH.

Figure 6:
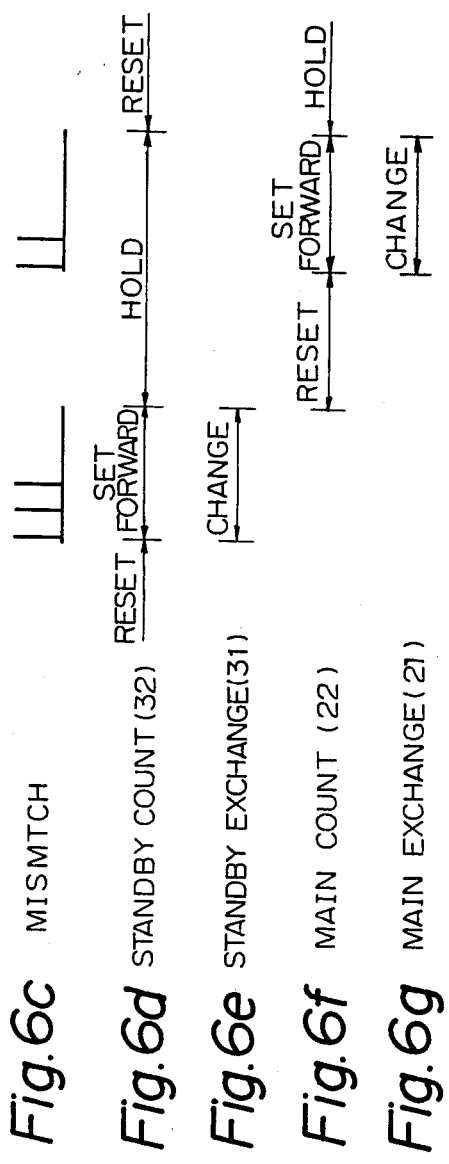
FIGS. 6a to 6g are graphs illustrating the operation of the exchange system of FIG. 5.

In an initial condition, the standby counting circuit 32 is at rest (FIG. 6d). The main channel-exchange data CM-DAT from the main exchange circuit 21 and the standby channel-exchange data CS-DAT from the standby exchange circuit 31, which is not yet exchanged at this stage and are available, is supplied to the phase detection and change circuit 11 and compared therebetween. When the phases therebetween do not coincide, the phase detection and change circuit 11 outputs the phase-mismatch signal MISMTCH (FIG. 6c). Upon receipt of the phase-mismatch signal MISMTCH, the exchange control circuit 12 outputs the standby exchange command SEXCH and sets the standby counting circuit 32 forward by one (FIG. 6d) These operations can be continued until the two phases coincide. When the two phases coincide, the phase detection and change circuit 11 outputs a switching response signal R-SW to the exchange control circuit 12 (FIG. 6b). The exchange control circuit 12 no longer outputs the standby exchange command SEXCH, holding a counted value in the standby counting circuit 32 (FIG. 6d). On the other hand, the exchange control circuit 12 resets the main counting circuit 22 (FIG. 6f).

According to the above operation, the phase difference between the main and standby radio-communication channel systems can be eliminated, and high-speed channel system exchange can be carried out by driving the switching circuits SWs in FIG. 1.

Thereafter, the switching demand signal D-SW is removed (FIG. 6a), placing the main radio-communication channel system into a recover mode where the main radio-communication channel system is restored when it is placed in a normal condition. The channel system exchange from the standby radio-communication channel system to the main radio-communication channel system can be carried out similarly to the above, but by using the main counting circuit 22 and the main exchange circuit 21 as shown in FIGS. 6f and 6g.

In addition, the phase detection and change circuit 11 carries out channel exchange of the received data to adjust the pattern mismatch, as shown in FIGS. 4a and 4b, due to the time difference for converting the serial data to the parallel data at the S/PCs in the two radio-communication channel systems, when a pattern mismatch is detected. After completion of the adjustment, the high-speed channel-system exchange can be effected.

Figure 7:
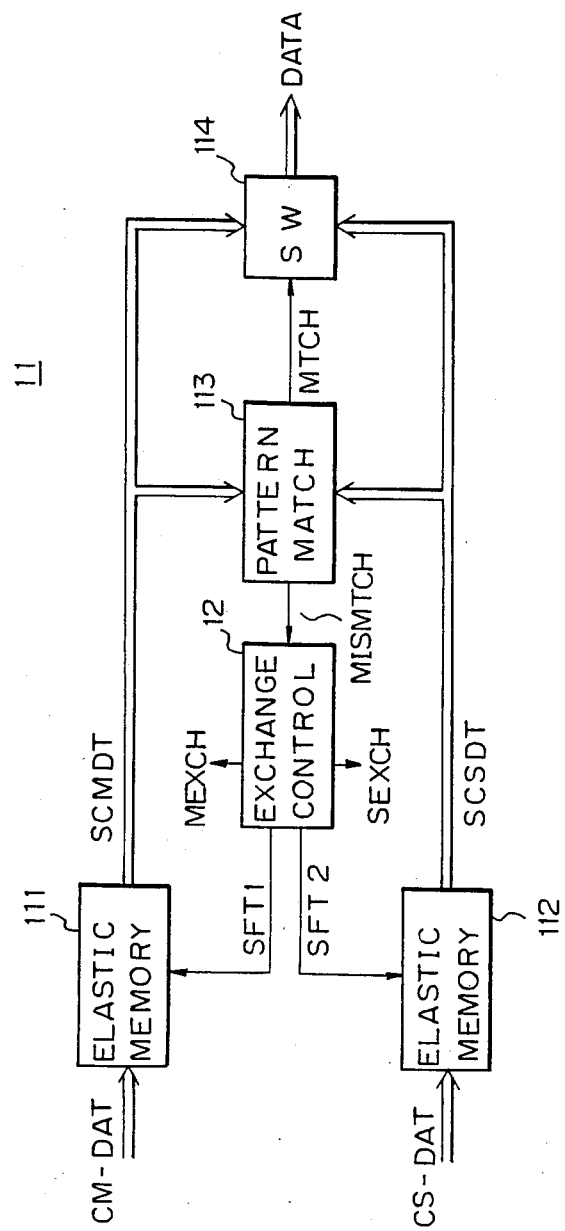
FIG. 7 is a circuit diagram of a switching unit shown in FIG. 5.

Referring to FIG. 7, the switching control unit 1 shown in FIG. 5 will be described more specifically. The phase detection and change circuit 11 includes a main elastic memory 111 receiving the main channel-exchange data CM-DAT, a standby elastic memory 112 receiving the standby channel-exchange data CS-DAT, a pattern match judgment circuit 113, and a high-speed switching circuit 114. The main elastic memory 111 may be formed by a shift register having a predetermined bit length sufficient for storing the main channel-exchange data CM-DAT. The standby elastic memory 112 may also be formed by a shift register having a predetermined bit length equal to that of the main elastic memory 111. The main elastic memory 111 shifts the input main channel-exchange data CM-DAT by certain bits on the basis of a shift signal SFT1 from the exchange control circuit 12 and outputs shifted data SCMDT to the pattern match judgment circuit 113 and the high-speed switching circuit 114. Similarly, the standby elastic memory 112 shifts the input standby channel-exchange data CS-DAT by certain bits in response to another shift signal SFT2 and outputs shifted data SCSDT to the circuits 113 and 114.

The pattern match judgment circuit 113 compares the shifted data SCMDT and SCSDT. When the two shifted data SCMDT and SCSDT perfectly coincide, the two shifted data lie in the same phase condition. Then, the pattern match judgment circuit 113 outputs a phase-match signal MTCH to the high-speed switching circuit 114, switching the shifted data SCMDT to the shifted data SCSDT when the main radio-communication channel system is abnormal, or vice-versa.

Alternatively, when the two shifted data SCMDT and SCSDT do not coincide, the pattern match judgment circuit 113 outputs a phase mismatch signal MISMTCH to the exchange control circuit 12. Upon receipt of the phase mismatch signal MISMTCH, the exchange control circuit 12 outputs the shift signal SFT2 indicating a one-bit data shift to the standby elastic memory 112 when the channel exchange is to be effected from the main radio-communication channel system to the standby radio-communication channel system. This shift operation is repeated until the two shifted data coincide. During this shift operation, the data in the main elastic memory 111 is not shifted. When the channel exchange is reverse to the above, the data in the main elastic memory 111 can be shifted. During the above shift operation, the exchange control circuit 12 outputs either the standby exchange command SEXCH to the standby counting circuit 32 shown in FIG. 5 or the main exchange command MEXCH to the main exchange counting circuit 22, inputting one bit of data of either the standby channel-exchange data CS-DAT or the main channel-exchange data CM-DAT to the standby elastic memory 112 or the main elastic memory 111. According to the above shift operation, the phase difference at the channel exchange can be eliminated.

However, a pattern mismatch due to the serial-to-parallel conversion may still remain when the branched data patterns are as shown in FIG. 4b. Next, the operation for eliminating the pattern mismatch will be described.

Figure 8A:
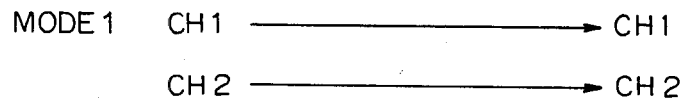
FIGS. 8a and 8b are graphs representing the channel exchange by the switching unit shown in FIG. 7.

FIG. 3 shows the serial-to-parallel data conversion circuit S/PC applied to a four phase shift keying (PSK) modulation. A source transmission signal S-ORG of 32 MHz having a serial form is branched into two series of channel data CH1 and CH2, each of 16 MHz. As shown in FIG. 4a, when the two branched data of the main S/PC and the standby S/PC coincide, the phase difference at the reception side can be eliminated by the above shift operation without the channel change as shown in FIG. 8a. Alternatively, when the two branched data do not coincide as shown in FIG. 4b, the channel-data change is needed shown in FIG. 8b. This channel-data change can be effected as follows:

(a) the above shift operation is effected for a predetermined bit data;

(b) when phase matching is not obtained throughout the predetermined bit data shift, the main exchange unit 2 or the standby exchange unit 3 delays one bit of data of the channel data CH2 and exchanges the channel data CH1 and the delayed channel data CH2; and (c) the pattern match judgment circuit 113 repeats the comparison and shift operation until the channel-changed channel data CH1 and the delayed and channel-changed data CH2 coincide.

Figure 9:
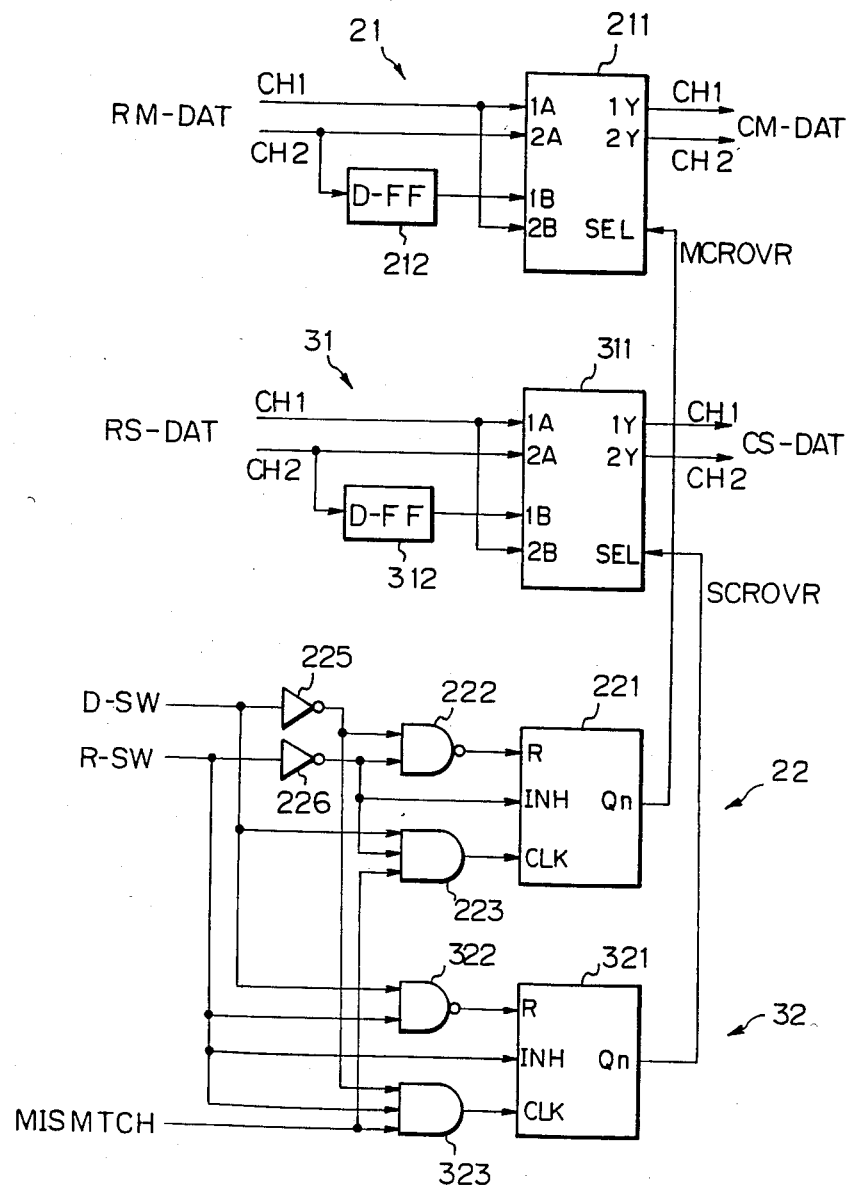
FIG. 9 is a detailed circuit diagram of the switching unit shown in FIG. 7.

FIG. 9 shows a circuit of the main exchange unit 2 and the standby exchange unit 3 for carrying out the channel exchange of four PSK modulation data described above. The main exchange unit 2 includes the main exchange circuit 21 consisting of a delay-type flip-flop (D-FF) 212 having a one-bit shift function and a selector 211 and the main counting circuit 22 consisting of a counter 221, a NAND gate 222, and an AND gate 223. The standby exchange unit 3 includes the standby exchange circuit 31 also consisting of a D-FF 312 and a selector 311, and the standby counting circuit 32 consisting of a counter 321, a NAND gate 322, and an AND gate 323. An inverter 225 receiving the switching demand signal D-SW and an inverter 226 receiving the switching response signal R-SW are provided in the exchange control circuit 12. Inverted signals D-SW and R-SW both are provided to the NAND gate 222, inverted signal R-SW is provided to the AND gates 223 and an inhibit terminal INH of the counter 221, and inverted signal D-SW is provided to the AND gate 323. The non-inverted signals D-SW and R-SW are supplied to the AND gates 223 and 323, respectively, both supplied to the NAND gate 322, and the non-inverted signal R-SW is supplied to an inhibit terminal INH of the counter 321. The phase-mismatch signal MISMTCH is also supplied to the AND gates 223 and 323 through the exchange control circuit 12 shown in FIG. 5. The main exchange command MEXCH and the standby exchange command SEXCH shown in FIGS. 5 and 7 are explicitly shown in FIG. 9, but, an output signal of the AND gate 223, connected to a clock terminal CLK of the counter 221, substantially corresponds to the main exchange command MEXCH, and an output signal of the AND gate 323, connected to a clock terminal CLK of the counter 321, also substantially corresponds the standby exchange command SEXCH. As can be easily understood, the switching demand signal D-SW and the inverted switching response signal R-SW are supplied to the AND gate 223, and the inverted switching demand signal D-SW and the switching response signal R-SW are supplied to the AND gate 323. This complementary circuit connection is the same for the NAND gates 222 and 322 and reset terminals R of the counters 221 and 321. Accordingly, the counters 221 and 321 operate exclusively from (or complementarily with) each other.

Referring to FIGS. 6a to 6g, the operation of the circuit shown in FIG. 9 will be described.

Figure 8B:
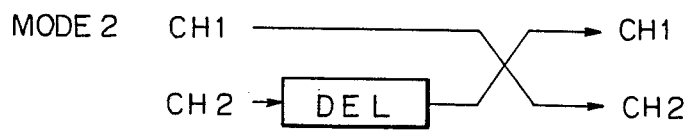

In the channel system exchange mode for exchanging from the main radio-communication channel system to the standby radio-communication channel system, a switching demand signal D-SW of a high level is supplied to the NAND gate 322 (FIG. 6a) resetting the counter 321 (FIG. 6d). The counter 321 counts up the phase-mismatch signal MISMTCH (FIG. 6c) through the AND gate 323. The counter 321 is preset at a predetermined value corresponding to the number of the predetermined bit data shift described above. When the counted value reaches the predetermined value, the counter 321 outputs a standby carry-over signal SCROVR from an output terminal Qn thereof. The carry-over signal SCROVR is supplied to a selection terminal SEL of the selector 311. Before receiving the carry-over signal SCROVR, the selector 311 outputs the standby reception data RS-DAT received at input terminals 1A and 1B to output terminals 1Y and 2Y as the standby channel-exchange data CS-DAT. This operation is illustrated in FIG. 8a. Upon receipt of the carry-over signal SCROVR, the selector 311 outputs the standby reception data RS-DAT, of which the channels CH1 and CH2 are exchanged and one bit of the channel CH2 is delayed, to the output terminals 1Y and 2Y. This operation is schematically illustrated in FIG. 8b. Clearly, when the phase match is established, the output of the phase-mismatch signal MISMTCH is terminated and the channel system exchange from the main radio-communication channel system to the standby radio-communication channel system is made by driving the switching circuit 114. The counter 321 is reset in response to the switching response signal R-SW.

The above operation is the same for the channel system exchange from the standby radio-communication channel system to the main radio-communication channel system, i.e., the reversal of the exchange of the channel system.

As described above, by eliminating the phase difference and by adjusting the pattern mismatch, channel system exchange without any loss of data can be achieved.

The elimination of the phase difference by using the elastic memories is applicable to all modulation data because the phase detection can be effected for serial data. However, the channel exchange must be modified according to the modulation.

Figure 10:
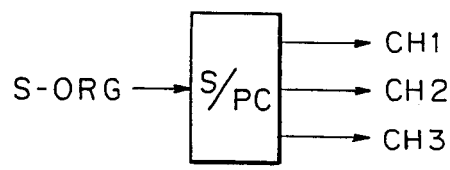
FIG. 10 is a block diagram of an S/PC for eight PSK.
Figure 11A:
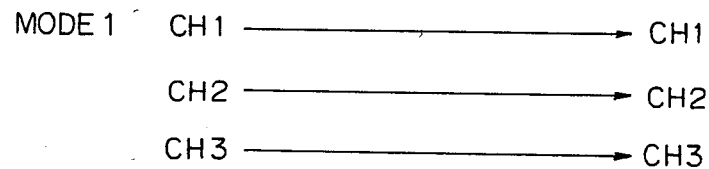
FIGS. 11a to 11c are graphs representing the channel exchange for eight PSK data.
Figure 11B:
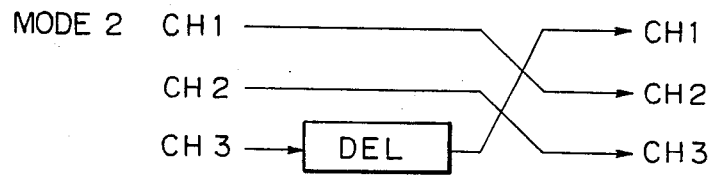
Figure 11C:
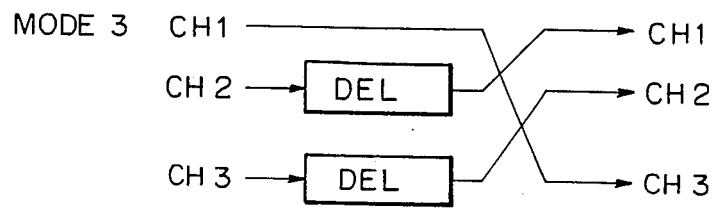
Figure 13A:
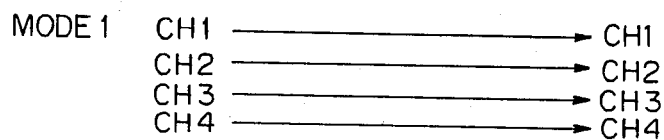
FIGS. 13a to 13d are graphs representing the channel exchange for 16 QAM data.
Figure 13B:
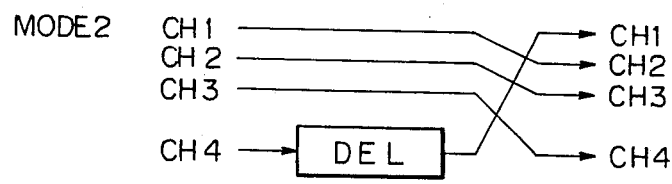
Figure 13C:
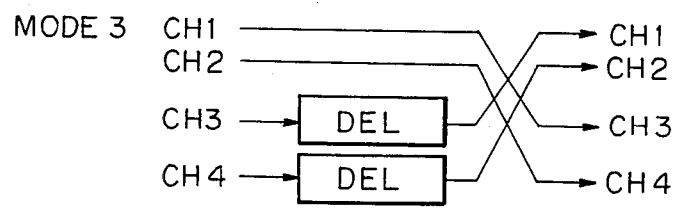
Figure 13D:
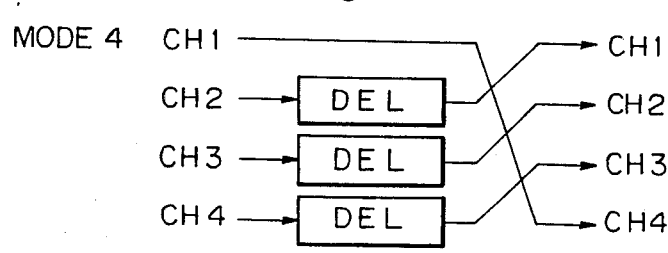

FIG. 10 is a block diagram of a serial-to-parallel converter for eight-phase PSK modulation. The S/PC receives serial transmission data S-ORG and converts the serial data to three channel parallel data CH1, CH2, and CH3. Accordingly, three modes of the channel exchange can be considered as shown in FIGS. 11a to 11c. First, the phase match detection is effected in a mode 1 shown in FIG. 11a. When the phase match is not obtained in spite of shifting the bits of data a predetermined amount, the channel exchange of a mode 2 shown in FIG. 11b is effected and the phase match detection is again effected. When the phase match is still not obtained, the channel exchange of a mode 3 shown in FIG. 11c and the phase match detection are further effected. The phase match can be obtained through the above operation.

Figure 12:
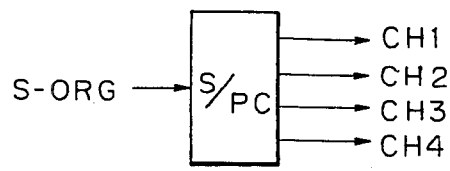
FIG. 12 is a block diagram of an S/PC for 16 quadrature amplitude modulation (QAM)

FIG. 12 is a block diagram of an S/P for 16 quadrature amplitude modulation (QAM). The S/PC receives serial transmission data S-ORG and converts it to four channel parallel data CH1 to CH4. Accordingly, four modes MODE1 to MODE4 of the channel exchange can be considered as shown in FIGS. 13a to 13d. The change of the mode is similar to the above for eight-phase PSK.

Figure 14:
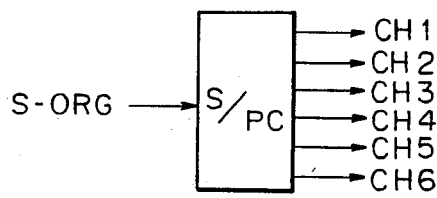
FIG. 14 is a block diagram of an S/PC for 64 QAM.
Figure 15A:
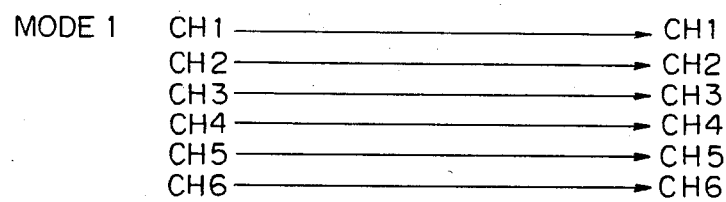
FIGS. 15a to 15f are graphs representing the channel exchange for 64 QAM data.
Figure 15B:
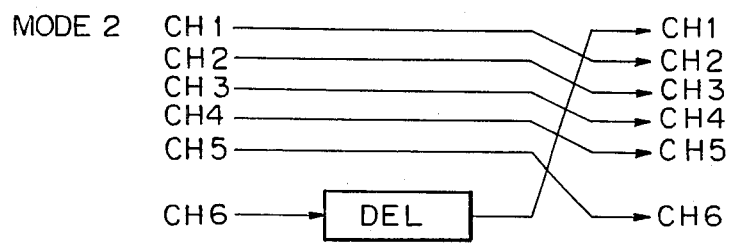
Figure 15C:
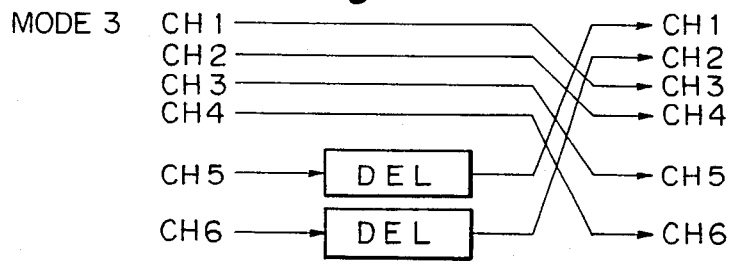
Figure 15D:
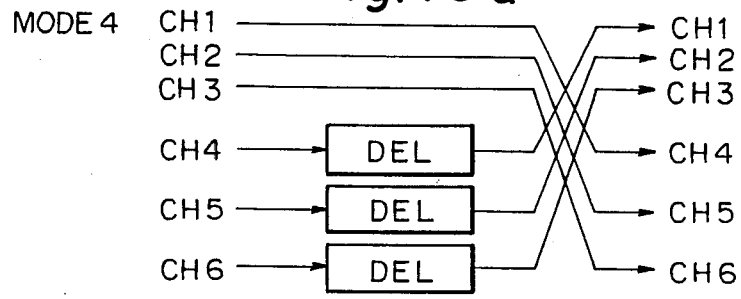
Figure 15E:
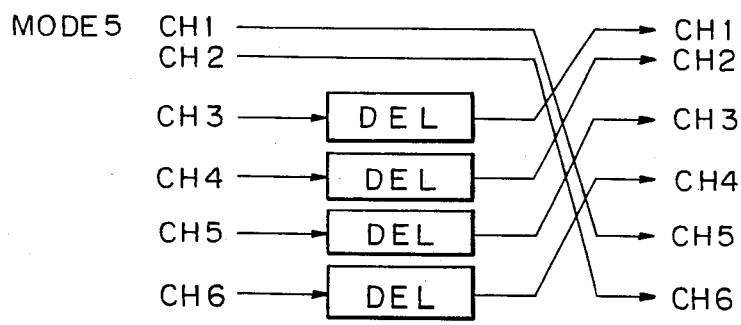
Figure 15F:
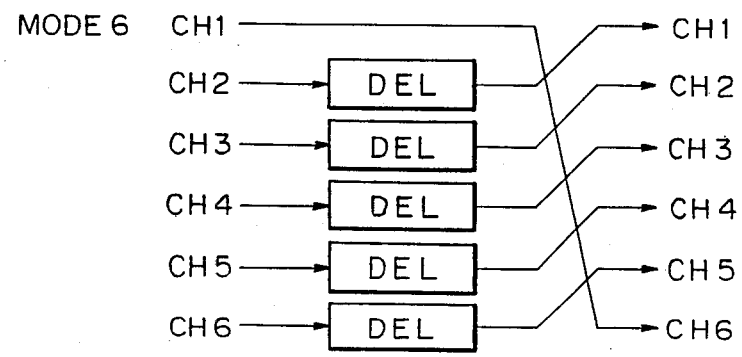

FIG. 14 is a block diagram of an S/PC for 64 QAM. The S/PC receives serial transmission data S-ORG and converts it to six channel parallel data CH1 to CH6. Accordingly, six modes MODE1 to MODE6 of the channel exchange can be considered, as shown in FIGS. 15a to 14f. The change of the mode is similar to the above for eight-phase PSK.

Many widely different embodiments of the present invention may be constructed without departing from the spirit and scope of the present invention. It should be understood that the present invention is not limited to the specific embodiments described in this specification, except as defined in the appended claims.

I claim:

1. A channel-system exchange system for a digital radio-communication system including at least one main radio-communication channel system and a standby communication channel system, said channel-system exchange system being provided at a reception side of each main communication channel system each main radio-communication channel system having at a transmission side a first serial-to-parallel data converter (S/PC) converting serial data to be transmitted to first channel data on the basis of a modulation method, and said standby radio-communication channel system having second S/PC at the transmission side having the same construction as said first S/PC and converting said serial data to second channel data on the basis of said modulation method, said channel-system exchange system in each main radio-communication channel system comprising:

first exchange means for exchanging said first channel data received at the reception side of said main radio-communication channel system between main channels;

second exchange means for exchanging said second channel data received at the reception side of said standby radio-communication channel system between standby channels; and switching control means, operatively connected to said first and second exchange means, for receiving said first channel data from said first exchange means and said second channel data from said second exchange means and for switching and outputting either said first channel data or said second channel data on the basis of a channel-system exchange mode, said switching control means detecting a phase match between said first channel data and said second channel data, shifting either said first or second data as required by said channel-system exchange mode until predetermined bits of data are shifted when said phase match is not obtained, and activating either said first or second exchange means as determined by said channel-system exchange mode when said shifting of predetermined bits of data is terminated, said activated exchange means delaying at least one channel of the channel data therein as defined by a first relationship based upon said modulation method by one bit and exchanging said channel data between the channels therein on the basis of a second relationship defined by said modulation method, and said switching control means repeating said phase match detection for said exchanged channel data and switching between said first and second channel data on the basis of said channel-system exchange mode when the phase match is obtained.

2. A channel-system exchange system according to claim 1, wherein said switching control means includes first memory means for receiving said first channel data, second memory means for receiving said second channel data, exchange control means operatively connected to said first and second memory means, pattern match detecting means, operatively connected to said exchange control means, for receiving said first and second channel data from said first and second memory means and for detecting a phase match therebetween, and switching means, operatively connected to said pattern matching means, for receiving said first and second channel data from said first and second memory means, said pattern match detecting means detecting whether a phase match exists between said received first and second data and outputting a phase match signal to said switch means when said phase match is detected or a phase mismatch signal to said exchange control means when said phase match is not detected, said exchange control means outputting a shift command to either said first or second memory means, as defined by said channel-system exchange mode, in response to said phase mismatch signal, said first or second memory means, in response to said shift command, shifts said received first or second data by a bit and outputs the same, said pattern match detecting means detecting whether a phase match exists between said shifted received first or second data and non-shifted received second or first data, said pattern match detecting and said data shifting being repeated a predetermined number of times, and said switch means switching between said received first and second data on the basis of said channel-system exchange mode in response to said phase match signal.

3. A channel-system exchange system according to claim 2, wherein said exchange control means outputs a channel exchange command to either said first or second exchange means, as defined by said channel-system exchange mode, when said predetermined number of repetitions is terminated, said first or second exchange means in response to said channel exchange command, delaying said first or second channel data, respectively, on the basis of said first relationship and exchanging the channel data between the channels therein on the basis of said second relationship, and said pattern match detecting, said data shifting, and said channel data exchanging being repeated until the phase match is obtained.

4. A channel-system exchange system according to claim 3, wherein said first exchange means includes at least one delay and exchange circuit set, the number of which is determined by the number of the parallel-converted channels, and a selection circuit, each of said delay and exchange circuit sets, in response to said first exchange means receiving said channel exchange command, delaying said first channel data as determined by said first relationship and exchanging said first channel data between the main channels on the basis of said second relationship, said selection circuit receiving the delayed and exchanged first channel data from said delay and exchange circuit set and directly receiving said second channel data which is not delayed and exchanged, and selecting one of the sets of said channel data from said received data in response to said exchange command.

5. A channel system exchange system according to claim 4, wherein said selection circuit consecutively selects the set of said channel data in response to said exchange command.

6. A channel-system exchange system according to claim 5, wherein said second exchange means includes at least one delay and exchange circuit set, the number of which is determined by the number of the parallel-converted channels, and a selection circuit, each of said delay and exchange circuit sets, in response to said second exchange means receiving said channel exchange command, delaying said second channel data as determined by said first relationship and exchanging said second channel data between the standby channels on the basis of said second relationship, said selection circuit receiving the delayed and exchanged second channel data from said delay and exchange circuit set and directly receiving said first channel data which is not delayed and exchanged, and selecting one of the sets of said channel data from said received data in response to said exchange command.

7. A channel-system exchange system according to claim 6, wherein said selection circuit consecutively selects the set of said channel data in response to said exchange command.

8. A channel-system exchange system according to claim 4, wherein said modulation method is four phase-shift keying, each of said S/PCs converts the serial data into two channels of data, and said first exchange means is provided with one set of said delay and exchange circuit.

9. A channel-system exchange system according to claim 4, wherein said modulation method is eight phase-shift keying, each of said S/PCs converts the serial data into three channels of data, and said first exchange means is provided with two sets of said delay and exchange circuit.

10. A channel-system exchange system according to claim 4, wherein said modulation method is 16 quadrature-amplitude modulation, each of said S/PCs converts the serial data into four channels of data, and said first exchange means is provided with three sets of said delay and exchange circuit.

11. A channel-system exchange system according to claim 4, wherein said modulation method is 64 quadrature-amplitude modulation, each of said S/PCs converts the serial data into six channels of data, and said first exchange means is provided with five sets of said delay and exchange circuit.

12. A channel-system exchange system according to claim 1 further comprising switching judgment means, operatively connected to said switching control means, for receiving said first channel data and said second channel data, for judging conditions of said main and standby radio-communication channel systems on the basis of said received channel data, and for outputting a signal indicating said channel-system exchange mode, as determined by said conditions, to said switching control means.

* * * * *

UNITED STATES PATENT AND TRADEMARK OFFICE
CERTIFICATE OF CORRECTION

PATENT NO. : 4,799,237
DATED : January 17, 1989
INVENTOR(S) : Hideaki Itoh

It is certified that error appears in the above-identified patent and that said Letters Patent is hereby corrected as shown below:

```
Col. 3, line 3, delete ",."

line 64, after "circuit" insert --SW--.

Col. 4, line 7, after "a" insert --separate--.

Col. 8, line 18, "gates" should be --gate--.

Col. 9, line 68, after "standby" insert --radio---.

Col. 10, line 3, after "main" insert --radio---.

Col. 11, line 63, "channel system" should be -- channel-system --.
```

Signed and Sealed this

First Day of August, 1989

Attest:

DONALD J. QUIGG

Attesting Officer  Commissioner of Patents and Trademarks